April 19, 1966   L. CELNIKER ETAL   3,246,862
HYBRID AIRCRAFT
Filed May 13, 1964   5 Sheets-Sheet 1
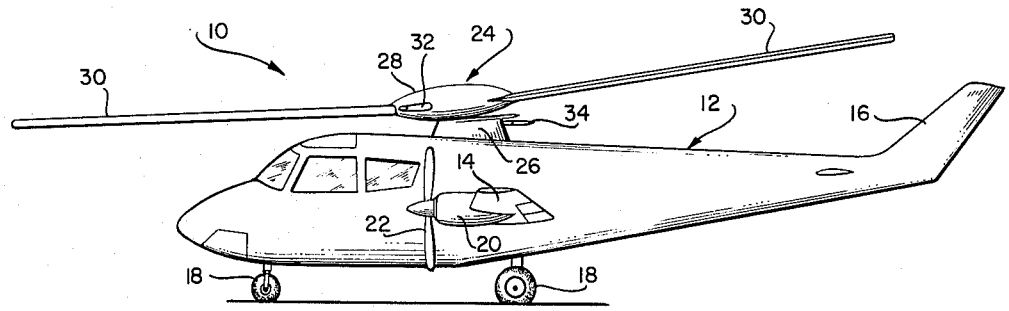
FIG_1
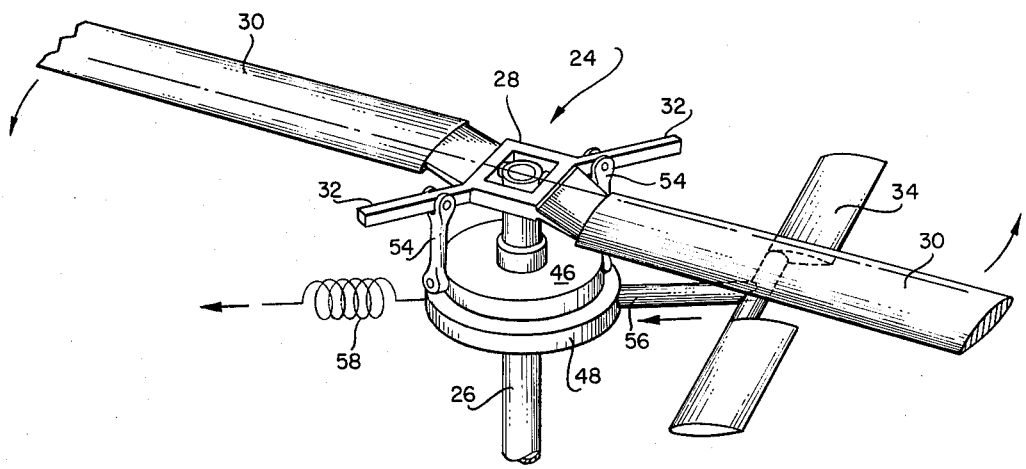
FIG_2
INVENTORS
LEO CELNIKER
SAMUEL J. SMYTH
IRVEN H. CULVER
By George Sullivan
Agent

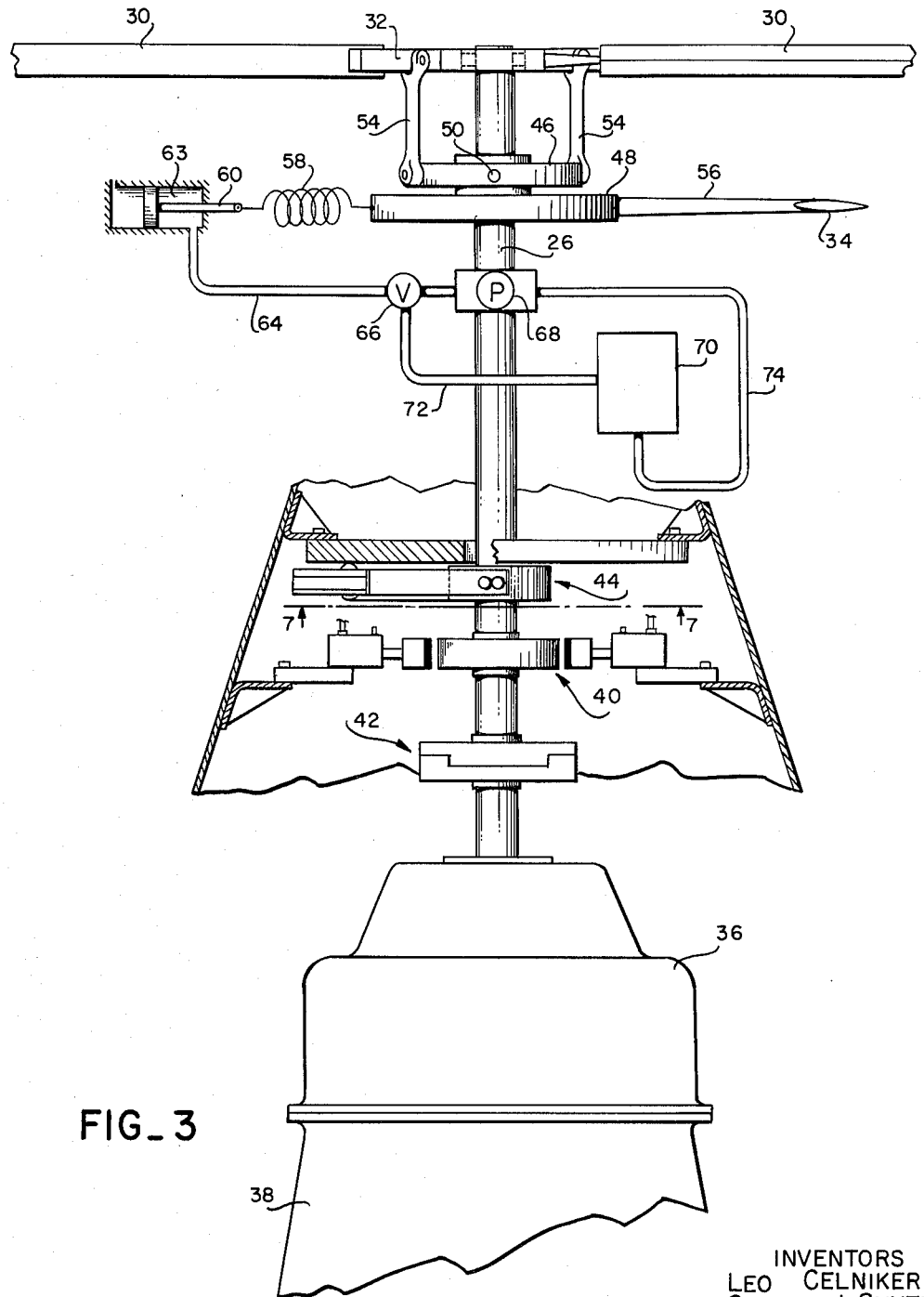
FIG_3

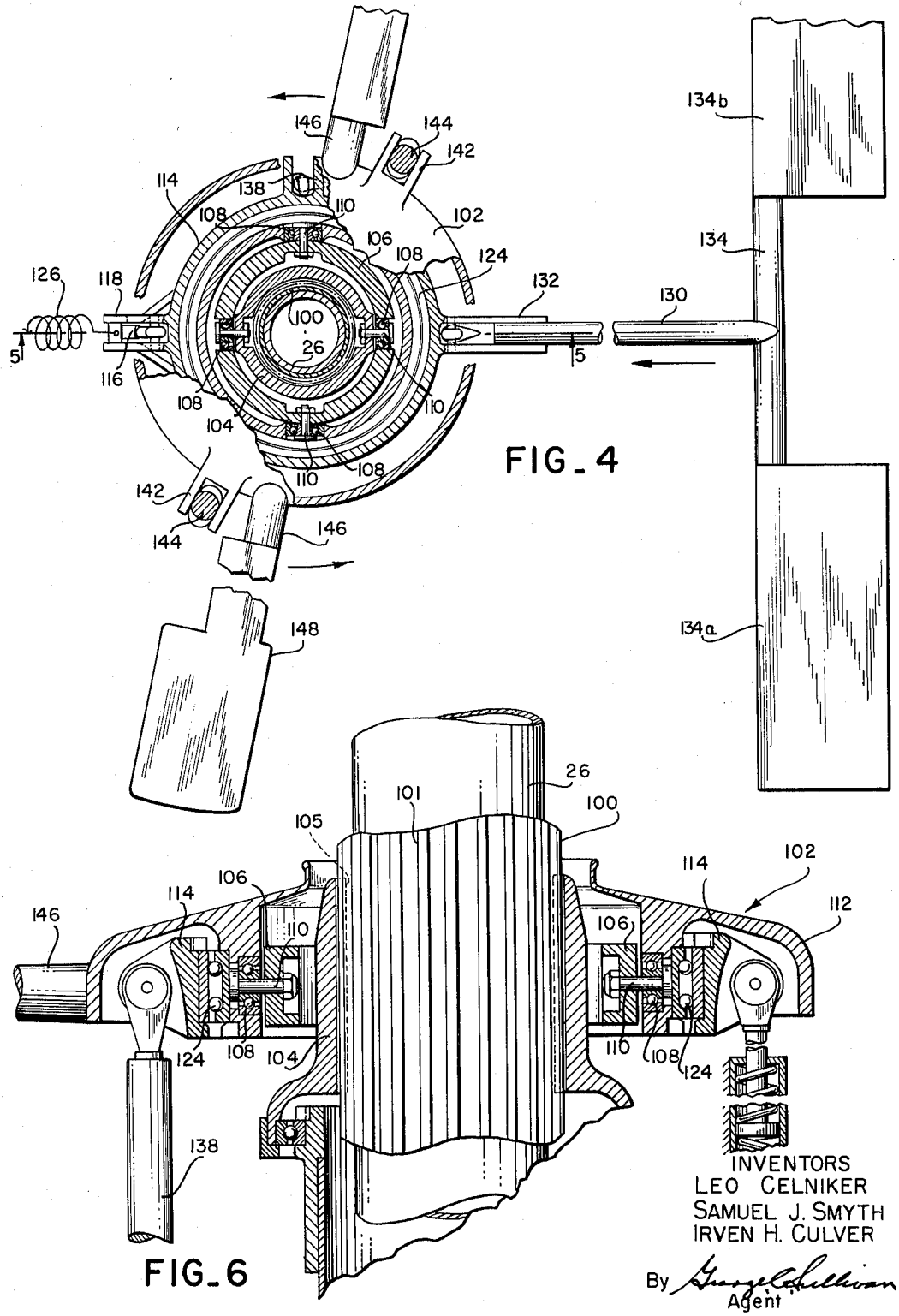

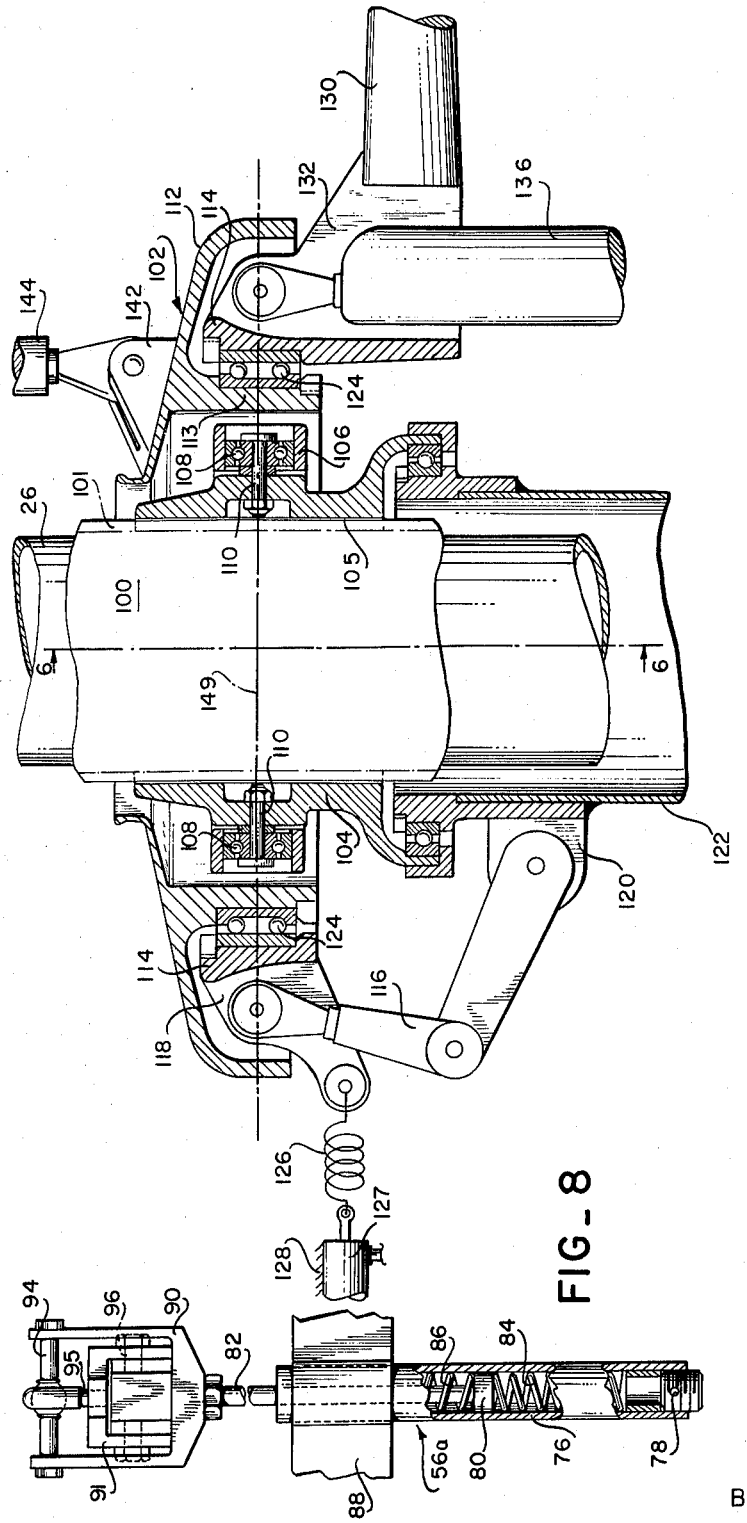

April 19, 1966  L. CELNIKER ETAL  3,246,862
HYBRID AIRCRAFT

Filed May 13, 1964  5 Sheets-Sheet 5

INVENTORS
LEO CELNIKER
SAMUEL J. SMYTH
IRVEN H. CULVER

By George C. Sullivan
Agent

United States Patent Office 3,246,862
Patented Apr. 19, 1966

3,246,862
HYBRID AIRCRAFT
Leo Celniker, Woodland Hills, Samuel J. Smyth, La Canada, and Irven H. Culver, Sunland, Calif., assignors to Lockheed Aircraft Corporation, Burbank, Calif.
Filed May 13, 1964, Ser. No. 366,980
11 Claims. (Cl. 244—7)

This invention relates to hybrid aircraft. More particularly, it relates to aircraft having characteristics of both conventional winged aircraft and helicopters wherein the helicopter-type rotor is capable of being stopped during forward flight.

Although helicopters over the years have been gradually improved in their payload carrying and speed capabilities and even though conventional aircraft have been improved in their ability to take off and land in restricted areas, a variety of missions exist where operation out of or into unprepared sites with large payloads and with maximum forward flight speed and cruise efficiency are required. Such missions are generally beyond the capabilities of both helicopters and conventional aircraft.

"Compound" helicopters wherein the airframe is provided with conventional wings and a helicopter rotor partially satisfy these requirements. Its rotor is slowed down and unloaded in forward flight, the thrust and lift during this operational mode being provided by conventional propellers and wings. Nevertheless, since the rotor provides no lift in the cruise condition but must continue to rotate, the aerodynamic drag of the idling rotor is relatively great. Additionally, while so idling, the maximum forward speed is severely restricted in view of the gust sensitivity of the unloaded rotor. The continuous rotation also necessitates relatively extensive maintenance procedures.

The present invention overcomes these basic deficiencies by providing means whereby the rotor, once the aircraft is in a forward operational mode sufficient to sustain flight, may be slowed down and completely stopped without susceptibility to the noted detrimental characteristics. The aircraft with the rotor stopped is then able to fly to much higher speeds. Hence, an aircraft is provided which, in many respects, is similar to the compound or unloaded rotor helicopter, but which also includes significant differences in operational characteristics. With the rotor rotation stopped the hub drag is significantly decreased. Such fundamental constraints on maximum forward flight speeds as rotor flapping instability and gust sensitivity which exist during rotor operation at reduced revolutions per minute (r.p.m.) are eliminated. Blade stresses, vibration and instability which would normally be expected to occur during rotor starting and stopping are minimized or eliminated. These beneficial characteristics are generally activated in the present invention through the provision of an aerodynamic stabilizer to control rotor operation at low r.p.m. and an r.p.m. sensitive spring to isolate the effect of the aerodynamic stabilizer at higher r.p.m.

A primary objective of this invention is to provide an aircraft having vertical take off and landing (VTOL) capabilities and a relatively high forward flight speed.

Another object is to provide an aircraft having VTOL and high speed capability without compromising range and payload.

A further object is to provide a hybrid aircraft having means for effectively stopping rotor rotation without subjecting the aircraft to undue instability.

A still further object is to provide a hybrid aircraft wherein the rotor may be stopped and started in forward flights and including means for locking the rotor in an orientation parallel to the longitudinal axis of the aircraft.

Yet another object is to provide a helicopter rotor system having aerodynamic control means and r.p.m. sensitive spring means for preventing operational instability during rotor operational modes.

Another object is to provide a helicopter rotor in a hybrid aircraft with gust-allevation means operating through a gimballed swash-plate such that aerodynamic stabilization means stabilizes the rotor throughout rotor starting and stopping phases during forward flight and spring mounting of the swash-plate overcomes the aerodynamic stabilizer operation during high rotor speed operation.

Other objects of the invention will become apparent upon examination of the specification and claims when considered in view of the accompanying drawings in which:

FIGURE 1 is an elevational illustration of a hybrid aircraft of the type contemplated herein;

FIGURE 2 is a semi-schematic perspective view of the rotor system of this invention;

FIGURE 3 is an elevational view of the FIGURE 2 rotor system schematic in somewhat greater detail;

FIGURE 4 is a top view of a typical operational embodiment of the invention;

FIGURE 5 is a sectional view taken along line 5—5 of FIGURE 4 and shown in partial cutaway to better illustrate the components thereof;

FIGURE 6 is a view taken along line 6—6 of FIGURE 5;

FIGURE 8 is an elevational view of an alternative embodiment of a spring stiffening mechanism.

Figure 7:
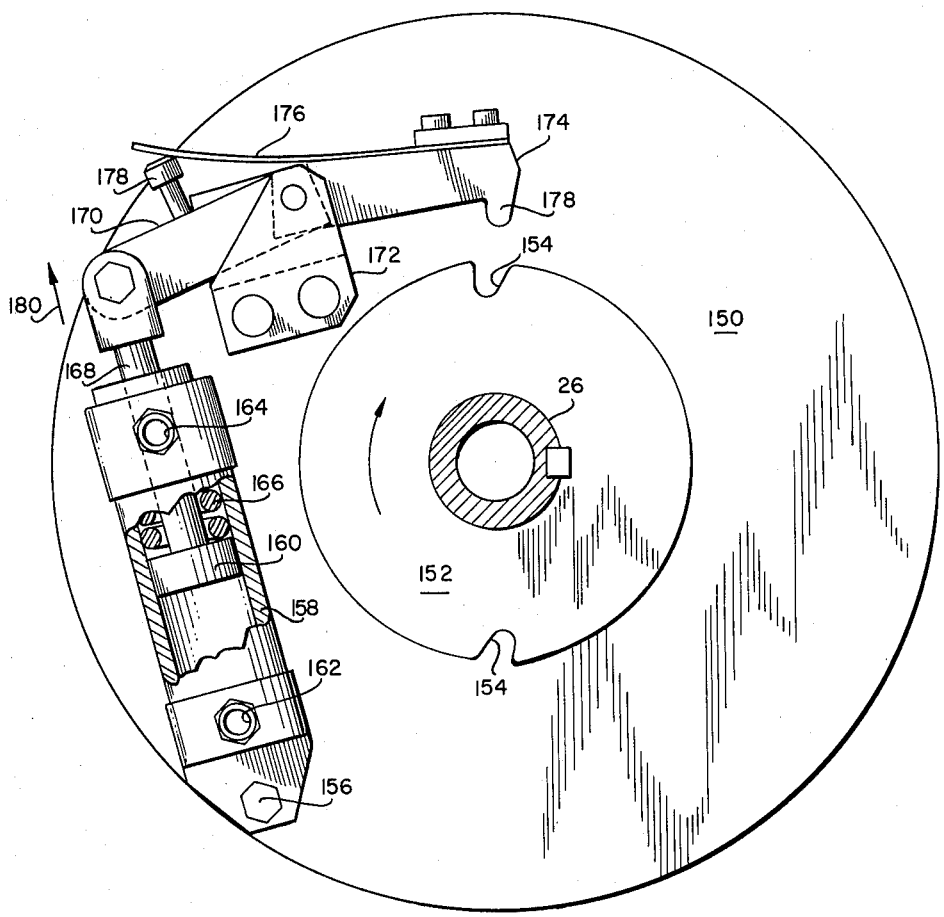
FIGURE 7 is a view of a rotor lock mechanism as taken along line 7—7 of FIGURE 3 and shown in greater detail.

In greater detail, FIGURE 1 representatively illustrates a hybrid type aircraft generally indicated by the numeral 10. A fuselage 12 supports conventional aerodynamic wings 14 and empennage structure 16. The aircraft includes conventional landing gear means 18. Alternatively, skids may be utilized. Engines 20 are mounted in the usual manner on the wings 14 and include propellers 22 of either the tractor type illustrated or the pusher type. Alternatively, jet engines (not shown) may be utilized.

A helicopter rotor 24 is supported through a faired shaft 26 and includes a hub 28 to which blades 30 are attached. Feathering control horns 32 are representatively shown to extend outwardly from the hub 28. They function also as gyro stabilizers. An aerodynamic stabilizer 34 extends from the fairing surrounding the shaft 26 to control the rotor 24, as explained in greater detail below.

It is to be understood that the specifically illustrated aircraft embodiment is representative only, variations therefrom intended to be within the scope of the invention so long as the rotor stopping mechanism hereinafter described is included with an aircraft adapted for forward propulsion by means separate from the helicopter rotor.

FIGURES 2 and 3 illustrate in semi-schematic fashion the novel control means for the helicopter rotor through which such rotor is provided with the aforementioned ability to be stopped while the aircraft is in forward flight without the introduction of detrimental flight instability. The rotor 24 is intended to be illustrative of the "fixed" rotor concept substantially as described in Patent No. 3,106,964, entitled: "Helicopter Rotor" by Irven H. Culver, et al. That patent is incorporated herein in its entirety by reference.

The rotor 24 is fixed to and adapted to be driven in rotation by the shaft 26, driven in turn by a conventional power means (not shown) through a transmission 36 contained within a housing 38. Conventional brake means 40, e.g., of the brake shoe type utilized in automobiles, is connected to the housing 38 and the shaft 26 to slow the shaft 26 in its rotary movement preparatory to stopping the rotor. A standard clutch 42 and a locking means 44 are provided for respectively facilitating rotor control and stabilization in the stopped position of the shaft 26. The specific configurations of the brake means 40, the clutch 42 and the locking means 44 form no part of this invention and any available means to serve these functions may be incorporated in the basic mechanism. However, for purposes of illustration, a representative locking means is specifically illustrated in FIGURE 7 and described below.

Supported upon shaft 26 are a pair of swash-plate elements 46 and 48. The swash-plate element 46 is mounted for rotation with the shaft 26 and the rotor 24. It is additionally gimballed (not illustrated in this schematic) for universal movement about an axial point 50.

The feathering or pitch control horns which extend laterally outward in opposite directions from the hub 28 act as counterweights for gyro control. A pair of pitch links 54 are pivotally connected at their respective ends to the feathering control bars and to the rotatable swash-plate element 46 to facilitate and control free feathering of the rotor blades 30 during stopping and starting cycles and to permit the blades to relieve flapping stresses through elastic-inertial relief at the higher r.p.m.s. The functions of these interconnected elements are further described below with respect to FIGURES 4, 5 and 6.

The swash-plate element 48 is mounted for gimballing with the element 46, but is non-rotating. Its general function is to control the rotor for relief from gust and otherwise induced blade loads and vibration throughout the start and stop modes. The aerodynamic stabilizer 34 is supported in a fixed relationship to the swash-plate element 48 through a support arm 56. Opposite the support arm 56 an r.p.m. sensitive spring 58 is fixedly connected to the swash-plate element 48. It is adapted to resist or cancel forces induced in the swash-plate 48 by the aerodynamic stabilizer 34 during certain phases of operation. In its preferred embodiment, the spring 58 is of a tension type and the piston rod 60 of an hydraulic piston-cylinder combination 63 is connected to its end opposite its swash-plate connection The piston is controlled by hydraulic pressure via line 64, a feedback orifice or appropriate bypass valve 66 in a bypass line 72 and a pump 68. The hydraulic fluid is circulated to and from a supply tank 70 through the bypass line 72 and a line 74. Alternatively or additionally, appropriately selected conventional control means may be adapted to either introduce to or bleed the hydraulic fluid from the cylinder 63. Introduction of fluid into the cylinder 63 causes retraction of the piston rod 60, extends and introduces tension into the spring 58 and thereby increases the spring force acting upon the swash-plate element 48. This force tends to resist any force otherwise introduced through the operation of the aerodynamic stabilizer 34, tending to move the swash-plate. Bleeding hydraulic fluid from the cylinder 63 causes the piston rod to extend, thereby relieving the tension upon spring 58 and permitting control of the swash-plate element 48 by the aerodynamic stabilizer 34. At low r.p.m., therefore, the pump pressure is low; the tension in spring 48 is low; and stabilizer effect relatively unopposed. At high r.p.m. the pump pressure is high, the tension in spring 48 is high and the effect of the spring is large.

An alternative embodiment of the spring 58 is shown in FIGURE 8 wherein the spring system 56a is shown to include a tubular member 76 closed at its lower extremity with the exception of an air bleed port 78. A piston 80, which is attached to a rod 82 and extends through the upper end of the tube 76, is disposed substantially intermediate of the tube 76. A pair of compression springs 84 and 86 are positioned within tube 76 on either side of the piston 80 such that it is normally centered, but such that downward movement of the piston 80 causes compression of the spring 84 and its upward movement causes compression of the spring 86. Hence, rapid piston movement in either direction is dampened and resistance to excessive movement is progressively increased. The tube 76 is affixed to stationary structure 88 and the piston rod 82 is connected to the swash-plate element 48 via yoke members 90 and 91 such that vertical movement of the swash-plate attachment point causes one of the compression springs to resist swash-plate movement, dependent upon the direction of movement. The yokes 90 and 91 support and are pivoted upon a bearing 92 through pins 94 and 95 such that the bearing center is upon the centerline of the swash-plate 56. Spring stiffening of the swash-plate element 48 is thereby controlled about such centerline. In this later approach the spring stiffness is not variable with r.p.m. and the spring. Stiffness, therefore, is selected to provide a reasonable compromise between the low r.p.m. and the high r.p.m. conditions.

A more nearly operational unit is illustrated in FIGURES 4 through 6. Therein, the rotor shaft 26 is mounted concentrically within a vertically fixed sleeve member 100 which includes a plurality of longitudinal grooves 101. A swash-plate 102 generally includes a central substantially tubular member 104, a gimbal ring 106, an external plate 112, and a ring member 114. The tubular member 104 includes a plurality of splines 105 engaged and slidable within the grooves 101. The tubular member 104 is thereby retained concentrically with respect to the sleeve member 100 and the rotor shaft 26.

The gimbal ring 106 concentrically surrounds a portion of the tubular member 104 and contains a series of bearings 108 positioned at 90 degrees with respect to one another. A pair of gimbal pins 110 tie the tubular member 104 to a pair of the bearings 108 on opposite sides of the tubular member. The gimbal ring 106 is thereby enabled to swivel on the gimbal pins and bearings about an axis through the pins. Opposite sides of the gimbal ring 106 are similarly connected to the external plate 112, thereby providing a fully gimballed relationship between the inner tubular member 104 and the external plate 112. It will also be noted that each of the elements 108 and 112 are also thereby caused to rotate with the rotor shaft 26.

The ring member 114 is bearing mounted to an internal flanged portion 113 of the plate 112 such that the ring member 114 is carried with the plate 112 throughout gimballing procedures, but permits the plate 112 to rotate with the shaft 26 and with respect to it (ring member 114) while the ring member is prevented from rotating. Its rotation is prevented by the presence of a scissors assembly 116. One arm of the scissors is connected to a flange 118 extending radially outward from the ring member 114. A second scissors arm is pivotally mounted to a flange 120 fixedly extending from a non-rotating collective pitch sleeve 122 concentrically surrounding the rotor shaft 26. The two scissors members are pivoted together at their ends opposite such connections. Hence, any rotational movement of the ring member 114 is resisted by the scissors through attachment to the non-rotating sleeve 122, free relative rotation between the plate 112 and the ring member 114 being facilitated through the existence of intermediate bearings 124.

Attached to an extension of the flange 118 is an r.p.m. sensitive spring 126 connected to the piston rod of an hydraulic cylinder 127 affixed to structure 128, this spring and cylinder combination being the equivalent of those illustrated in FIGURE 3. It is generally preferable, although not specifically so illustrated, that the axis of the spring and cylinder assembly and their connection to the swash-plate assembly, pass through the vertical axis of rotor shaft 26 at the point through which the axis 149 also crosses it.

Opposite the scissors connection a support arm 130 is affixed to a flange 132 extending radially outward from the ring member 114 to support an aerodynamic stabilizer 134. In the preferred embodiment illustrated in FIGURE 5 the aerodynamic stabilizer 134 includes two aerodynamic foil sections 134a and 134b upon either side of the support member 130 and fixedly extending normal thereto. Although they are in a basically horizontal plane when the aircraft is in level flight, their specific size, shape and angle of attack may be varied according to design characteristics of the particular vehicle to which they are adapted.

A lateral control push rod 136 is also mounted to pivot universally with respect to the flange 132. Similarly, a longitudinal control push rod 138 is pivotally connected to a flange 140, usually oriented at 90 degrees from the lateral control push rod, upon the ring member 114. Detailed function and operation of these push rods, together with a full explanation of the function and operation of the collective pitch sleeve 122, which is bearing-mounted to the lower extremity of the tubular member 104, is fully explained in the above referenced patent. Affixed to the upper surface of the external plate 112 are a pair of flanges 142 to which a pair of pitch links 144 are pivotally mounted. These pitch links are similarly attached to the rotor blades for pitch control. Further details with respect to specific structure, function and operation of these links is also set forth in the cited patent.

Extending radially outward from the periphery of the external plate 112 are a pair of gyro control arms 146 which include airfoil sections 148 on the outer extremities thereof to facilitate rotor pitch control and act as gyro stabilizers as further explained in the patent identified above. The gimbal portions are mounted, as are the fork and control push rod connections, upon a common axis 149.

A representative embodiment of a mechanism for locking the rotor in a stopped position with assurance that the rotor is oriented in the plane of the longitudinal axis of the airplane is illustrated in detail in FIGURE 7.

A structural support plate 150 which may be affixed to any convenient stationary structure is provided for mounting the locking mechanism. A lock plate 152 is keyed to the shaft 26 for rotation therewith. The lock plate 152 includes a pair of detent-receiving grooves 154 on its opposite sides.

Mounted upon the support plate 150 for pivoting about a point 156 is an air actuatable cylinder 158 having a double acting piston 160 therein adapted to be actuated by air pressure entering and exhausting through ports 162 and 164. The piston may be appropriately dampened and normally actuated into the retracted position illustrated by means of the spring 166. A piston rod 168 connected to the piston 160 is connected to one end of a pivot arm 170, the opposite end of which is pivoted to a support bracket 172 which also pivotally supports a lock key member 174. The lock key member 174 has a locking spring 176 of the leaf spring variety affixed to its outer extremity. The opposite free end of the locking spring 176 is engageable by a contact member 178 affixed to the pivot arm 170 so as to extend therefrom into actuating engagement with the locking spring. The lock key member 174 includes a detent 178 extending from its outer extremity toward the locking grooves 154 of the lock plate 152.

When forward flight has been achieved and the rotor has been slowed almost to a stop, air is introduced into the cylinder 158 through port 162 to extend the piston rod 168. This causes the pivot arm 170 and the contact member 178 to move outward in the arc indicated by arrow 180. The contact member 178 engages the locking spring 176, forces it outward and thereby causes the lock key 174 to be pivoted about its pivot point until the detent 178 engages the circumferential surface of the lock plate 152. The lock plate continues to turn with shaft 26 until such time as one of the locking grooves 154 becomes aligned with the detent 178. The force of the contact member 178 against the locking spring 176 then causes the detent 178 to snap into that locking groove. This engagement locks the plate 152 and the rotor shaft 26 and causes the rotor to be stopped, the rotor lying essentially in the plane of the longitudinal axis of the aircraft. Unlocking is accomplished by releasing the air pressure through the port 162, thereby permitting the spring 166 to return the piston 160 to its initial position intermediate of the cylinder 158. Pressure may be introduced through the port 164 to provide a more positive action. The locking elements attached thereto are thus caused to return to their original positions, disengaging the detent 178 from its locking groove 156 and permitting the shaft 26 and its supported rotor to again rotate.

Operationally, the hybird aircraft 10, in a take off procedure, is caused to rise substantially vertically through the operation of the rotor 24 in the same manner as would a conventional helicopter. The engines 20 may be operational or non-operational during take off. The primary forward flight mode is achieved, however, through their operation. During ascent procedures the rotor 24 is rotated at a relatively high r.p.m. Forward flight is initiated during such high r.p.m. operation, the r.p.m. sensitive spring 58 of the schematic FIGURES 2 and 3 or the spring 130 in FIGURE 4 being caused through the actuation of their associated hydraulic cylinders and responsive to the rotor rotation to exert a maximum force upon the swash-plate portion to which they are attached. Any effect upon the swash-plate and the rotor which would otherwise be exerted by the aerodynamic stabilizer, which is connected to the same swash-plate element, is thereby isolated and made inactive. The downwash of the helicopter rotor therefore has no effect upon the system resultant from the positioning of the aerodynamic stabilizer within the downwash air stream of the helicopter rotor.

During such rotor operation, as explained with respect to FIGURES 4, 5 and 6, the rotor shaft 26 causes the rotor to turn. The rotor, through its connection to the pitch links 144, forces the external gimbal plate 112 to rotate, carrying with it the gyro control arms 146 and their airfoil sections 148, the gimbal ring 106, the tubular member 104, and the sleeve member 100. Throughout such rotation the ring member 114 is retained in its stationary position through the action of the scissors assembly 116 and its connection to the non-rotating collective pitch sleeve 122.

By virtue of the gimbal mounted relationship of the complete swash-plate assembly, pitch control of the rotor blades is accomplished by causing their rotation about their axes through the movement of the pitch links 144, as controlled by the gyro control airfoil sections 148 and the lateral and longitudinal control push rods 136 and 138, respectively, the aerodynamic stabilizer and the r.p.m. sensitive spring means.

When a forward flight mode sufficient to sustain the aircraft in airborne operation has been achieved and is capable of being sustained by the engines 20 and the propellers 22, the rotor speed is slowed through appropriate control of the rotor driving power means and through the action of a brake such as brake means 40 in FIGURE 3. Since the pump 68 is controlled by the rotor speed, the amount of fluid actuating the hydraulic cylinder which controls the r.p.m. sensitive spring is thereby decreased and the tension upon such spring is relieved. This permits the aerodynamic stabilizer 134 to become functional to the extent that such tension is released. The airflow across the airfoil sections of the aerodynamic stabilizer stabilizes its position and, therefore, the orientation of the gimballed swash-plate assembly to which it is connected. This stabilizing force is imparted to the rotor through the interconnected pitch links. Sensitivity of the rotor to air gusts with the normally resulting rotor instability is thereby overcome and substantially obviated. Hence, the particular problem of such instability during slow rotor operation and a forward flight mode of the aircraft is no longer detrimental to the aircraft operation and the rotor may be stopped without such difficulty.

When the brake means 40 has slowed rotor rotation to a substantial standstill, the locking mechanism of FIGURE 7 is actuated, causing the rotor to be stopped with its blades oriented substantially in the plane of the longitudinal axis of the aircraft. Maximum stability during forward flight operation with minimum introduction of instability characteristics by the stopped rotor is thereby achieved.

In order to again start the rotor the procedure is substantially reversed. The locking mechanism is disengaged, permitting the rotor to turn freely. With the brake disengaged and the clutch engaged the rotor is then caused to rotate at a slow speed, the aerodynamic stabilizer again being effective to stabilize its operation. As the rotor r.p.m. increases the force exerted upon the swash-plate is gradually increased by the r.p.m. sensitive spring means and the effect of the aerodynamic stabilizer is continuously decreased until such time as its effect upon the swash-plate is completely isolated by a maximum tension upon the spring.

Through the structure and the function of the invention, as heretofore described, a hybrid aircraft having desirable stability characteristics throughout its operation from take off to landing and through in-flight stopping and starting of the helicopter rotor is achieved and the objects of invention are met. Having described these details, the following combinations and their equivalents are intended to be covered by this invention.

We claim:

1. In a hybrid aircraft having an aerodynamic wing-supported fuselage and a helicopter rotor rotatably extending from an upper portion thereof:
   aerodynamically responsive means connected to the rotor for controlling the rotor during forward flight; and
   separate control means connected to said aerodynamically responsive means and to the fuselage for substantially cancelling the effect of said aerodynamically responsive means during high speed rotor operation.

2. A hybrid aircraft comprising:
   a fuselage for carrying a payload;
   aerodynamic wing and control surface structures extending outward from said fuselage upon either side and at the rear thereof for supporting and controlling said fuselage in forward flight;
   a helicopter rotor support shaft extending upward from said fuselage and rotatably mounted with respect thereto;
   a helicopter rotor mounted upon said shaft for rotation therewith;
   propulsion means for propelling said aircraft in forward flight;
   power means for turning said rotor;
   aerodynamically responsive means connected to said rotor for stabilizing said rotor during forward flight; and
   separate control means connected to said aerodynamically responsive means and said fuselage for substantially cancelling the effect of said aerodynamically responsive means during high rotor speed operational phases.

3. The hybrid aircraft of claim 2 further comprising:
   a swash-plate mounted upon said rotor support shaft adjacent said rotor and universally movable with respect thereto;
   a first portion of said swash-plate being non-rotatable and having said aerodynamically responsive means and said separate control means connected thereto; and
   a second portion of said swash-plate being rotatable with said rotor and said rotor support shaft, said second swash-plate portion being connected to said rotor for controlling rotor blade pitch responsive to inputs from said aerodynamically responsive means.

4. Hybrid aircraft of claim 2 further comprising:
   a swash-plate having a first and a second portion, said swash-plate being gimbal mounted upon said rotor support shaft for universal movement with respect thereto;
   said first portion of said swash-plate extending below said second portion, said aerodynamically responsive means being rigidly affixed to said first portion in a spatially separated relationship;
   said separate control means being connected to said first portion at a position opposite the connection of said aerodynamically responsive means; and
   said second portion being rotatable with said rotor and said rotor support shaft and pivotally connected to said rotor by link means to control rotor pitch responsive to inputs from said aerodynamic means.

5. The hybrid aircraft of claim 4 wherein:
   said aerodynamically responsive means is an airfoil section mounted in a plane substantially parallel to said wing; and
   said separate control means is a spring adapted to exert a varying force responsive to the rotational speed of said rotor and so as to be substantially unloaded at low rotor speed and to exert a high force upon said first swash-plate portion during high rotor speed operation.

6. A control system for a hybrid aircraft having aerodynamic support surfaces and forward propulsion means and a rotatably powered helicopter rotor comprising:
   control means for alleviating gust-induced rotor instability, said control means including an aerodynamically responsive foil connected to said rotor for controlling said rotor during low speed operation, and means responsive to rotor speed for by-passing the effect of said aerodynamically responsive means.

7. In an aircraft having wing means extending from opposite sides of a fuselage, forward propulsion means, a rotor shaft extending upward from the fuselage and supporting a helicopter rotor having pitch-controllable rotor blades, and power and control means for the helicoptor rotor:
   a swash-plate assembly disposed about and gimballed with respect to the rotor shaft, said gimbal assembly connected to said rotor so as to selectively control the pitch of the rotor blades;
   a first portion of said gimbal assembly being non-rotatable with respect to the rotor shaft and a second portion of said gimbal assembly being rotatable with said rotor shaft;
   a support member radially extending from said first portion;
   an aerodynamic stabilizer affixed to an extremity of said support member remote from said first portion; and
   spring means affixed to said first portion opposite said support member, said spring means being controllable to apply tension to said first portion in proportion to the rotational speed of the helicopter rotor, said tension being substantially relieved at low rotational speeds and of maximum effect at high rotational speeds.

8. The structure of claim 7 wherein said aerodynamic stabilizer is an airfoil section having its chord generally oriented in the forward flight direction of the aircraft.

9. The structure of claim 7 wherein said spring means comprises a cylinder having a double-acting piston connected to said first portion of said gimbal assembly and a compression spring contained within said cylinder upon either side of said piston so as to resist piston movement.

10. The structure of claim 7 wherein said spring means comprises:
   a tension spring connected to said first gimbal assembly portion and an hydraulically controllable piston and cylinder assembly connected to an opposite end of said spring and adapted to increasingly apply tension to said spring as rotor speed is increased.

11. In an aircraft having wing means extending from opposite sides of a fuselage, forward propulsion means, a rotor shaft extending upward from the fuselage and supporting a helicopter rotor having pitch controllable rotor blades, and power and control means for the helicopter rotor, the control means including:
- a swash-plate assembly gimbal mounted about the rotor shaft for introducing control signals to the rotor, said swash-plate assembly comprising:
- a tubular member concentrically disposed about the rotor shaft and adapted for vertical movement thereover;
- a gimbal ring concentrically oriented about said tubular member and pivotally mounted to opposite sides thereof for relative rotation about an axis through such mounts;
- a plate disposed circumferentially about said gimbal ring and pivotally mounted thereto for rotation about an axis perpendicular to said first-mentioned axis and including means upon a surface thereof for transmitting signals to the helicopter rotor;
- a ring member mounted upon said plate, bearing means being disposed between said plate and said ring member to facilitate rotation of said plate, said gimbal ring and tubular member with respect to said ring member;
- aerodynamic stabilizer means affixed to and remotely separated from said ring member; and
- spring means affixed to said ring member opposite said aerodynamic stabilizer means and adapted to permit said aerodynamic stabilizer means to function during low speed rotor operation and to cancel its effect upon said rotor during high rotor speed operation.

No references cited.

MILTON BUCHLER, *Primary Examiner.*
A. E. CORRIGAN, *Assistant Examiner.*